:::

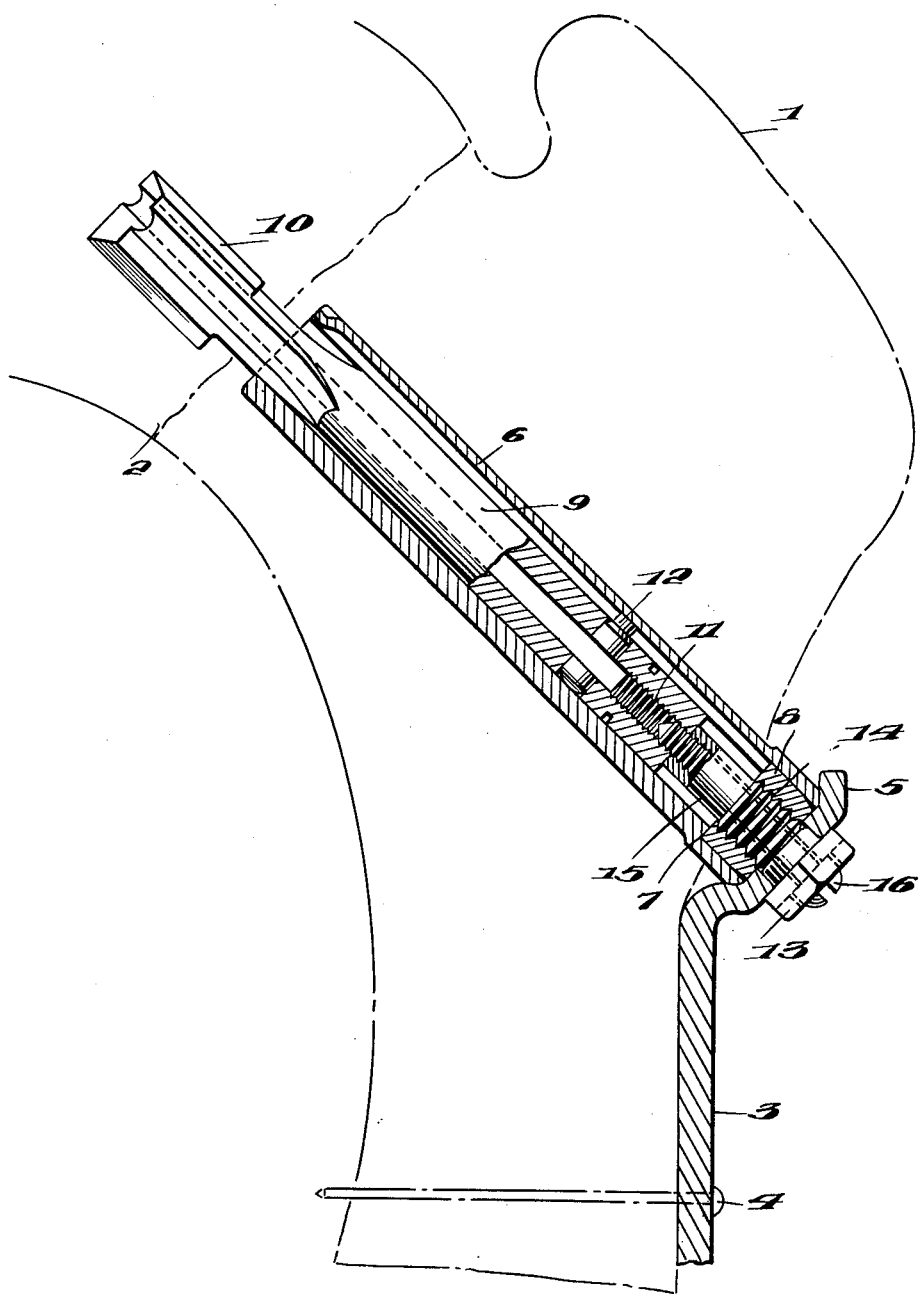

United States Patent Office 3,029,811
Patented Apr. 17, 1962

3,029,811
SURGICAL HIP NAIL
Clyde E. Yost, Evansville, Ind., assignor to Ken Standard Corporation, Evansville, Ind., a company
Filed Apr. 25, 1960, Ser. No. 24,408
2 Claims. (Cl. 128—92)

This invention relates to a surgical hip nail and more particularly to a nail which is positively locked in position within the bone.

In one type of prior art hip nails, known as the Smith-Peterson Nail, the nail comprises a single element which is driven into the hip bone to fix the fracture. This nail is maintained in place by an arm which is held in place by screws through the outer surface of the bone. With this type of hip nail, the nail is maintained rigidly in place but it is necessary that the surgeon maintain a large supply of various sized nails to meet different operational requirements.

In order to overcome the disadvantage of maintaining a large stock of various sized nails the structure disclosed in my prior Patent 2,834,342, issued May 13, 1958, was developed. According to this construction the single Smith-Peterson Nail is replaced by a sleeve having a slidable nail therein. The nail could be driven to any desired depth and the frictional resistance between the nail and sleeve is made adjustable. By using devices of this type the necessity for maintaining a large stock of various sized nails is obviated but it is difficult for the surgeon to cause the nail to become locked in position within the sleeve where such locking action appears desirable. A further disadvantage of the nail construction disclosed in my prior patent is that the nail, sleeve and arm assembly were inserted in the drilled hole as a unit and, if the angle between the sleeve and arm did not exactly match the angle between the outer face of the bone and the hole drilled by the surgeon, the assembly could not be properly seated.

According to the present invention the advantages of the Smith-Peterson Nail are combined with the advantages inherent in the type nail described in my prior patent. That is to say, the nail according to the present invention is locked in position as in the case of the Smith-Peterson Nail and an adjustable length nail is provided. Furthermore, it is possible according to the presently disclosed nail to change the angle between the sleeve and the arm by a simple adjustment. After the nail has been hammered to its final position within the sleeve a spacer bolt is screwed into the sleeve into abutting relationship with the end of the nail. This prevents the nail from moving to a retracted position within the sleeve. There is further provided a screw which is adapted to extend through the spacer bolt and into threaded engagement with the nail. With this screw firmly seated the nail is locked in preselected position within the sleeve. By virtue of this construction it is only necessary that the surgeon maintain a supply of bolts and lock screws of various lengths so as to suit the needs of any particular fracture and it is unnecessary that a supply of nails of varying length be kept on hand.

An object of the present invention is to provide an adjustable length hip nail which may be locked in various selected positions.

Another object of the present invention is to provide an adjustable length hip nail in which the nail is slidable within a sleeve assembly and in which the nail can be driven to an extended position with respect to the sleeve and either locked in such extended position or by using a short spacer bolt the nail can retract to a slight extent by frictional resistance.

Other objects and many of the attendant advantages of the present invention will become apparent upon consideration of the following detail specification in connection with the accompanying drawing wherein the single figure is a sectional side elevational view of a nail assembly according to the present invention.

Referring now more specifically to the drawing wherein like numerals indicate like parts throughout the several views there is shown at 1 a bone having a fracture as shown at 2. The nail assembly comprises an arm 3 held in place on the outer face of the bone by screws 4. The arm has an end portion 5 which receives the sleeve 6 seated thereagainst. Sleeve 6 has a shouldered end portion 7 into which is press fit a nut 8. Nail 9 having knife edged end portion 10 is slidably received within the sleeve. The opposite end portion of the nail is interiorly threaded as at 11 for a purpose which will be explained more fully hereinafter. A pin 12 fixedly mounted on the nail is received within a groove on the inner face of sleeve 6 to prevent the nail from rotating with respect to the sleeve.

A bolt 13 having a right handed threaded portion 14, and an unthreaded spacer portion 15 is received within the aperture in plate 3, screws into nut 8 and abuts the end of nail 9. A left handed threaded screw 16 is adapted to extend through a central aperture in the bolt 13 and this screw engages the threaded portion 11 of the nail. It can thus be seen that the nail cannot retract within the sleeve because of the abutment with bolt 13 and it cannot move outwardly of the sleeve due to engagement by the screw 16 and the locking effect caused by the left and right handed threads opposing each other.

The operation of the presently disclosed device is as follows:

The bone is first drilled to receive the sleeve 6 and nail 9 assembly. When this assembly is in place the nail is hammered through the sleeve so that the knife edges 10 on the end portion of the nail cut through the bone to the final position bridging the fracture 2. It can be seen that the pin 12 on the nail engaging a groove in the inner face of the sleeve prevents the sleeve and nail from rotating with respect to each other.

The arm 3 is then placed in position with the end portion 5 overlying the end of the sleeve 6. In the event that the angle between the sleeve and arm is incorrect, the end portion 5 may be bent to provide a firm seating between these members. The arm is then secured in position by screws 4. There are provided a plurality of bolts 13 having spacer portions 15 of various lengths and the appropriate bolt 13 is selected to fit the exact location of the nail in the sleeve so that the nail and bolt will be in abutting relationship. A corresponding screw 16 is selected to lock the nail in place within the sleeve.

It can be seen that by virtue of this construction the nail is firmly locked in position and yet an adjustable length nail is provided. In addition it is possible to adjust the angle between the sleeve and arm to suit any operational requirement. It is only necessary that the surgeon maintain a supply of bolts 13 and screws 16 of various sizes on hand.

Obviously many modifications and variations of the present invention are possible in light of the above teachings. What is claimed as new and is desired to be secured by Letters Patent is:

1. A surgical device for fixation of bone fractures comprising a plate having an angular apertured end portion, means for securing said plate to the outer surface of a bone, a sleeve extending into the bone and having the end thereof aligned with the apertured end portion of said plate, a nut press fit in the end of said sleeve, a bolt having a threaded portion adjacent the head thereof, said bolt securing said sleeve to said plate, a nail slidably disposed within said sleeve and adapted to be driven into the bone through the fractured portion thereof, spacer means disposed within said sleeve and abutting said nail for spacing said nail at a predetermined point from the end of the sleeve, and locking means comprising a screw passing through said bolt and said spacer means and threaded into said nail for locking said nail in position against said spacer means.

2. A surgical device according to claim 1 wherein said spacer means comprises an unthreaded portion on the end of said bolt.

References Cited in the file of this patent

UNITED STATES PATENTS

| | | |
|---|---|---|
| 2,628,614 | Briggs | Feb. 17, 1953 |
| 2,702,543 | Pugh | Feb. 22, 1955 |

FOREIGN PATENTS

| | | |
|---|---|---|
| 1,136,123 | France | Dec. 22, 1956 |

OTHER REFERENCES

Journal of Bone and Joint Surgery, October 1948, pages 1009 and 1010 relied on. (Copy in Division 55.)